United States Patent [19]

Adams, IV

[11] Patent Number: 4,459,715
[45] Date of Patent: Jul. 17, 1984

[54] BEEHIVE

[76] Inventor: John Q. Adams, IV, 1206 Foxcroft Rd., Richmond, Va. 23229

[21] Appl. No.: 418,812

[22] Filed: Sep. 16, 1982

Related U.S. Application Data

[63] Continuation-in-part of Ser. No. 236,112, Feb. 19, 1981, Pat. No. 4,349,927.

[51] Int. Cl.$^3$ .................. A01K 47/00; A01K 47/02
[52] U.S. Cl. ................................................ 6/1; 6/10
[58] Field of Search .................. 6/1, 2 R, 2 A, 10, 11

[56] References Cited

U.S. PATENT DOCUMENTS

| | | | |
|---|---|---|---|
| 143,383 | 9/1873 | Rasey | 6/10 |
| 508,285 | 11/1893 | Cole | 6/1 X |
| 1,116,919 | 11/1914 | Rahn | 6/2 R |
| 1,773,221 | 8/1930 | Davis | 6/10 |
| 2,162,413 | 6/1939 | Wisniewski | 6/2 R |
| 2,709,265 | 5/1955 | Luse | 6/10 X |

FOREIGN PATENT DOCUMENTS

| | | | |
|---|---|---|---|
| 388721 | 11/1973 | U.S.S.R. | 6/1 |
| 728803 | 4/1980 | U.S.S.R. | 6/1 |

Primary Examiner—Robert P. Swiatek
Attorney, Agent, or Firm—B. P. Fishburne, Jr.

[57] ABSTRACT

An elongated rectangular cross section hive body provides increased useable volume compared to a Kenya hive. An easily replaceable flat bottom board for the hive body is provided. Raised end walls for the hive body enable using selectively standard or top bar frames in the hive body. Side handle strips on the hive body having sloping top faces facilitate the use of a hive tool for easy removal of a simplified top board for the hive body. Honey and brood frames for the hive of increased strength and stability are provided. The hive body possesses greater stackability than the prior art without loss of stability.

3 Claims, 6 Drawing Figures

U.S. Patent  Jul. 17, 1984  4,459,715
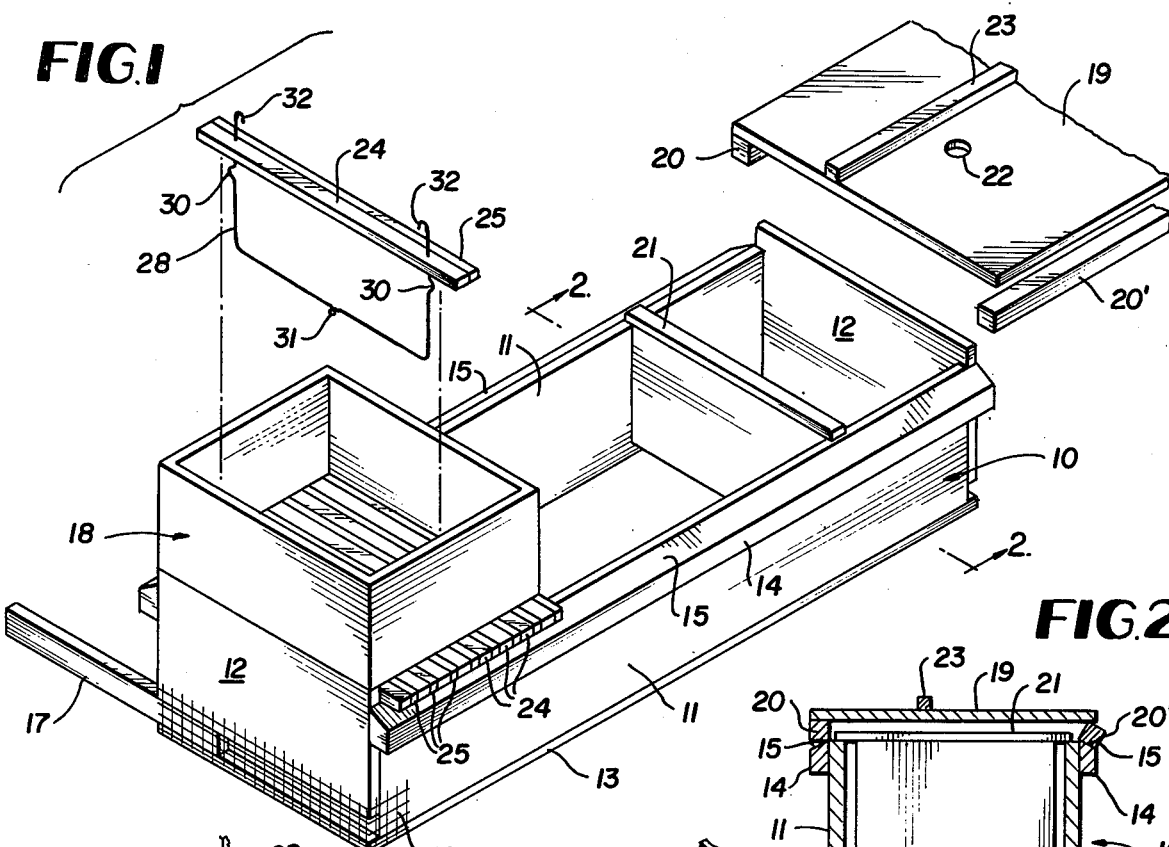
FIG.1
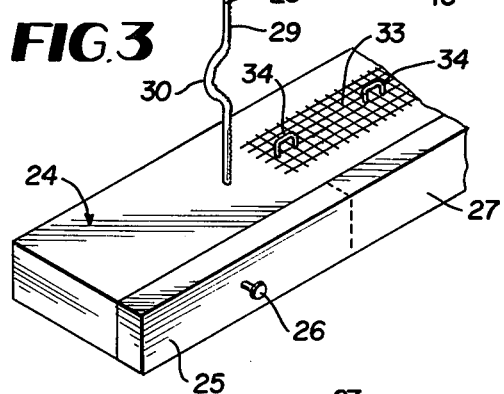
FIG.2
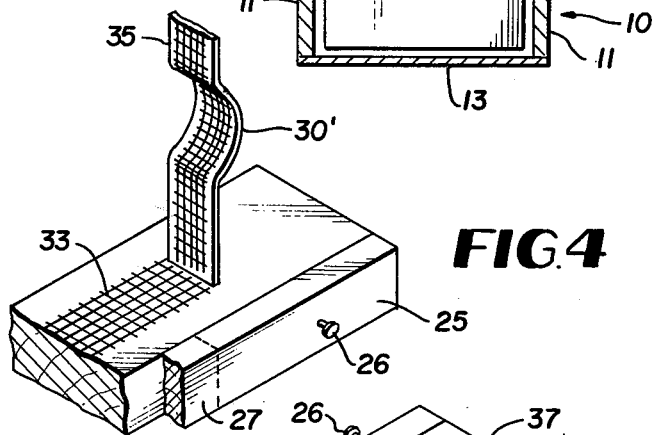
FIG.3
FIG.4
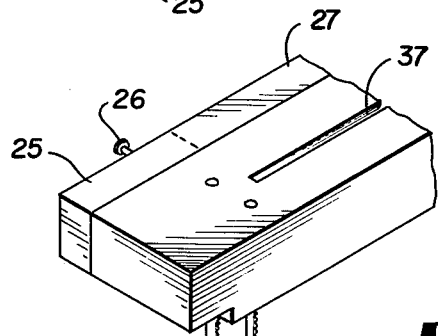
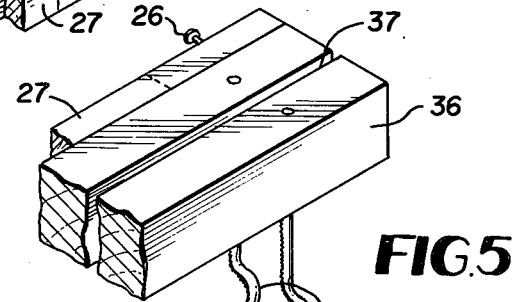
FIG.5
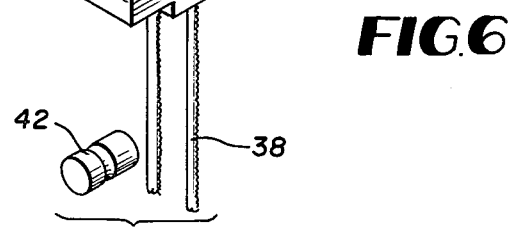
FIG.6
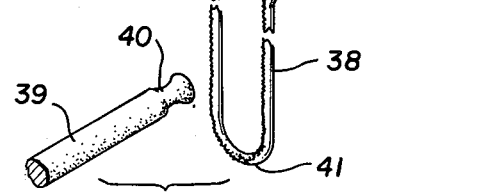

BEEHIVE

CROSS-REFERENCE TO RELATED APPLICATION

This application is a continuation-in-part of application Ser. No. 236,112, filed Feb. 19, 1981, for BEEHIVE IMPROVEMENTS, now U.S. Pat. No. 4,349,927.

BACKGROUND OF THE INVENTION

This invention relates to improvements in beehives generally, and relates particularly to improvements in the hive structure disclosed in the above-referenced patent.

An object of the present invention is to provide a long hive of greater stability and stackability and greater useable volume than the hive in said patent.

Another object is to provide a long hive which can be used with or without the penthouse wintering feature disclosed in said patent.

Still another object is to provide brood and honey frames for a beehive which is stronger and more convenient to use and more efficient in the promotion of propolization and comb construction.

Another important object of the invention is to provide a hive having an improved cover board which is more easily removable by means of a hive tool and which provides ventilization for the hive.

Still another object is to provide a hive which can accommodate standard frames or top bar frames.

Other features and advantages of the invention will become apparent during the course of the following description.

BRIEF DESCRIPTION OF THE DRAWINGS

FIG. 1 is a partly exploded perspective view of a beehive constructed according to the present invention.

FIG. 2 is a transverse vertical section through the hive and top cover board on a reduced scale, taken on line 2—2 of FIG. 1.

FIG. 3 is an enlarged fragmentary inverted perspective view of a hive frame according to the invention.

FIG. 4 is a similar view of a modified form of frame.

FIG. 5 is a fragmentary perspective view of one end portion of a further modified frame.

FIG. 6 is a similar view of another type of frame.

DETAILED DESCRIPTION

Referring to the drawings in detail, wherein like numerals designate like parts, a beehive according to the present invention comprises a long body 10 of rectangular cross section including parallel vertical side walls 11 and end walls 12 which rise somewhat above the top edges of the side walls 11 to enable the use of either standard frames or top bar frames in the hive, as will be further described. The hive body has a flat bottom board 13 lightly tacked to the side walls 11 to allow convenient replacement of the bottom board after a period of time, as when rotting may take place due to ground moisture.

Lifting bars or strips 14 having sloping top faces 15 are secured to side walls 11 at their top edges. As in the prior referenced patent, one end of the hive body 10 is equipped with a rodent guard screen 16 and a sliding closure stick 17.

The hive body 10 may be utilized with or without a penthouse wintering enclosure 18 of the type shown in the referenced patent.

A top board 19 for the open top hive body is provided and has a longitudinal mounting strip 20 secured to its bottom along one edge adapted to rest upon the adjacent underlying hive body lifting bar 14, FIG. 2. A similar mounting strip or bar 20' is attached to the sloping surface 15 of the opposite side lifting bar 14 and is unattached to the top board 19 which merely rests freely on the upper corner of the strip 20'. This arrangement, shown in FIG. 2, allows the easy entry of a prying type hive tool between the edge of top board 19 which overlies the angled strip or bar 20'. Similarly, the hive tool can be easily engaged between the bar 20 and the sloping face 15 at the opposite side of the hive body.

This described arrangement renders it feasible and convenient to place standard hive frames 21 in the long hive body with their tops cradled beneath the board 19 and between the two mounting strips 20 and 20'. The tops of these standard frames rest freely on the top level edges of the side walls 11, instead of being recessed below such edges, thereby rendering it easy to dislodge the standard frames with a hive tool after the top board 19 is removed.

In lieu of the top board 19, a multiplicity of standard frames 21 with their tops in side-by-side engagement and covered by a sheet of roofing paper or the like, can constitute the roof of the hive. When the top board 19 is used as the roof as shown in FIG. 2, it will have suitable ventilating openings 22 and a raised strip 23 secured lengthwise to its top face. If roofing paper or the like is placed over the top board 19, the raised rib 23 will hold the paper clear of the ventilating openings 22 so as not to block ventilation.

In lieu of standard frames 21, as described above, top bar frames 24 with intervening spacers may be utilized. Such top bar frames are shown in FIG. 1 beneath the penthouse 18 but may be employed anywhere along the hive body exclusively, if desired. As shown, the top bar frames have their top bars resting on the upper edges of the side walls 11 and extending outwardly above the lifting bars 14 and their sloping top faces 15. When employed, these top bars arranged in side-by-side engagement can form a roof for the hive body, particularly when covered by a sheet of roofing paper, and the top board 19 with mounting bars 20,20' need not be used.

As shown in FIG. 3 which depicts a top bar frame inverted for ease of illustration, a side spacer strip 25 may be lightly tacked removably to the top bar of the frame at 26 for easy removal when not needed. If desired, the center portion 27 of the spacer strip can be cut away and removed to produce a bee crawl space, as described in the referenced patent.

Each frame 24 includes a wire frame body 28 roughened as at 29 at least on the interior to better anchor the wax. Shoulder projections 30 are formed in the opposite sides of the wire frame bodies to provide stand-off spacing from the opposing side walls 11. A loop 31 is formed in the bottom member of each wire frame body to allow hanging the frame upside-down for storage.

The sides of the wire frame body 28 have top terminal hooks 32 which are driven downwardly into the wooden top bar of the frame during assembly to better anchor the wire frame body to the top bar. This increases the stability of the frame.

Additionally, a section of screen 33 or other rough material is stapled at 34 to the bottom face of the top bar of each frame 24 within the confines of wire frame body 28. This screen serves as a base which the bees will propolize and begin building upon in a downward direction.

As shown in the modification of FIG. 4, instead of the roughened wire frame body 28, a similarly roughened frame body of flat strip material 35 may be used, which material may be formed to produce the side wall spacing or stand-off shoulders 30'.

In accordance with another modification, FIG. 5, a frame is provided having a top bar 36 provided with a narrow slit 37 extending therethrough from top-to-bottom and extending longitudinally through one end of the bar 36 to a point near but short of the other end of the bar as shown in FIG. 6. This slit can receive a sheet of foundation wax which can be anchored in place by pressing the opposite sides of the bar 36 together on the sheet clampingly.

Looped roughened depending wire legs 38 are anchored to opposite end portions of the bar 36, utilizing the hook terminals 32, if desired, and a suitable crossbar 39 of wood is engaged at its ends 40 within the bight portions 41 at the bottoms of legs 38 to complete a frame.

FIG. 6 shows another slight modificaton of a top bar frame where, in lieu of the bottom crossbar 39, small wooden elements 42 may be snappingly engaged between the branches of each wire loop leg 38 so as to form anchors at the bottom of the frame for wax attachment.

An advantage of the narrow slit 37, FIG. 5, is that the open end of the slit will be filled by the bees with propolis on which the honeycomb is constructed.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A beehive comprising a long hive body of rectangular cross section having two vertical side walls of equal heights and two end walls whose top edges are spaced above the top edges of the side walls, whereby the hive body can accommodate either standard frames or top bar frames resting upon the top edges of said side walls, a top board for the hive body having opposite end portions adapted to rest on the top edges of said end walls, a frame adapted for placement within the hive body in a vertical position between the side walls of the hive body and comprising a top bar adapted to rest on the top edges of said side walls and a frame body dependingly secured to the top bar and having roughened portions at least on the interiors of its opposite sides, a screen section fixed to the bottom face of said top bar within the confines of the frame body, and the frame body being constructed of wire and having opposite side top terminal hooks adapted to be driven downwardly into the top of said top bar for securely anchoring the wire frame body thereto.

2. A beehive as defined in claim 1, and stand-off shoulder loops formed in the opposite sides of the wire frame body below the top bar.

3. A beehive comprising a long hive body of rectangular cross section having two vertical side walls of equal heights and two end walls whose top edges are spaced above the top edges of the side walls, whereby the hive body can accommodate either standard frames or top bar frames resting upon the top edges of said side walls, a top board for the hive body having opposite end portions adapted to rest on the top edges of said end walls, a frame adapted for placement within the hive body in a vertical position between the side walls of the hive body and comprising a top bar adapted to rest on the top edges of said side walls and a frame body dependingly secured to the top bar and having roughened portions at least on the interiors of its opposite sides, a screen section fixed to the bottom face of said top bar within the confines of the frame body, the top bar of said frame having a longitudinal slit formed therethrough vertically and substantially centrally and said slit extending lengthwise of the top bar throughout a major portion of its length and opening through one end of the top bar, and said frame body comprising a pair of roughened wire loop legs depending from the top bar in substantially parallel relationship, and a bottom cross member engageable supportively within the bottom bight portions of the wire loop legs.

* * * * *